United States Patent [19]

Yoshida et al.

[11] Patent Number: 5,646,199
[45] Date of Patent: Jul. 8, 1997

[54] COMPOSITION FOR MOLD

[75] Inventors: Akira Yoshida; Kazuhiko Kiuchi; Naoki Kyochika; Akio Mamba; Hitoshi Funada, all of Aichi, Japan

[73] Assignee: Kao Corporation, Tokyo, Japan

[21] Appl. No.: 915,678

[22] Filed: Jul. 21, 1992

[30] Foreign Application Priority Data

Jul. 22, 1991 [JP] Japan .................................. 3-180948
Jul. 22, 1991 [JP] Japan .................................. 3-180959

[51] Int. Cl.$^6$ .................. B22C 1/10; C08F 283/00; C08G 8/28
[52] U.S. Cl. .................. 123/139; 523/145; 523/146; 528/129; 525/480; 525/503; 525/504; 525/506; 525/508
[58] Field of Search .................. 523/139, 145, 523/146; 528/129; 525/480, 503, 504, 506, 508

[56] References Cited

U.S. PATENT DOCUMENTS

| | | | |
|---|---|---|---|
| 3,725,333 | 4/1973 | Adkins et al. | 260/38 |
| 4,273,910 | 6/1981 | Lederer | 528/48 |
| 4,311,619 | 1/1982 | Seeney et al. | 260/7 |
| 4,460,629 | 7/1984 | Haraga et al. | 523/139 |
| 4,468,359 | 8/1984 | Lemon et al. | 523/139 |
| 4,474,904 | 10/1984 | Lemon et al. | 423/139 |
| 4,543,373 | 9/1985 | Krawiec et al. | 523/144 |
| 5,021,539 | 6/1991 | Armbruster et al. | 528/129 |
| 5,043,412 | 8/1991 | Chandramouli et al. | 528/129 |
| 5,214,111 | 5/1993 | Gerber | 523/139 |
| 5,223,554 | 6/1993 | Gerber | 523/139 |
| 5,294,649 | 3/1994 | Gerber | 523/139 |

FOREIGN PATENT DOCUMENTS

| | | |
|---|---|---|
| 0202004 | 11/1986 | European Pat. Off. . |
| 336533 | 10/1989 | European Pat. Off. . |
| 336534 | 10/1989 | European Pat. Off. . |
| 0376432 | 7/1990 | European Pat. Off. . |
| 388145 | 9/1990 | European Pat. Off. . |
| 0465919 | 1/1992 | European Pat. Off. . |
| 0465919A1 | 3/1992 | European Pat. Off. . |
| 769344A1 | 3/1971 | Germany . |
| 1769344 | 3/1971 | Germany . |
| 50-130627 | 10/1975 | Japan . |
| 58-154433 | 9/1983 | Japan . |
| 58-154434 | 9/1983 | Japan . |
| 1262042 | 10/1989 | Japan . |
| 1262043 | 10/1989 | Japan . |
| 2017126 | 10/1979 | United Kingdom . |
| 2115825 | 9/1983 | United Kingdom . |

OTHER PUBLICATIONS

Patent Abstract of Japan, vol. 9, No. 55 (M–362) (1778) Mar. 9, 1985 & JP-A-59 189 030 (Mazda KK) Oct. 26, 1984.

Database WPIL, Week 8910, Derwent Publications Ltd., London, GB; AN 89–071558 & JP-A-1 022 446 (Hodogaya Ashland) Jan. 28, 1989.

Patent Abstracts of Japan JP-A-61 063 335 (Rigunaito KK) Apr. 1, 1986.

English Translation of Japanese Laid Open No. 130627/1975 Oct. 16, 1975.

Foundry Trade Journal, "Modern Sand Binders—A Review", Dec. 1989, pp. 922–926, vol. 163.

*Primary Examiner*—Samuel A. Acquah
*Assistant Examiner*—Duc Truong
*Attorney, Agent, or Firm*—Birch, Stewart, Kolasch & Birch, LLP

[57] ABSTRACT

A binder resin composition, a curing agent composition, a caking additive composition, a kit, a casting mold composition and a process for manufacturing a casting mold are disclosed, wherein a metallic compound containing a metallic element belonging to Group IB to VIII of the Periodic Table is utilized. The compositions are useful for the production of a sand mold for casting, having an excellent strength, from reclaimed sand, in a self-hardening or gas hardening mold process. The casting mold according to the present invention, which is manufactured in the presence of a metallic compound containing a metallic element belonging to Group IB to VIII of the Perioidic Table has excellent strength.

36 Claims, No Drawings

COMPOSITION FOR MOLD

BACKGROUND OF THE INVENTION

1. Field of the Invention

The present invention relates to a binder resin composition, a curing agent composition, a caking additive composition and a casting mold composition for a self-hardening or gas-hardening mold process, a sand mold for casting and a process for producing the same. More particularly, the present invention relates to a binder resin composition, a curing agent composition, a caking additive composition and a casting mold composition which are useful in a process for the production of a sand mold for casting by molding a refractory particulate material with a water-soluble phenolic resin as a binder and an organic ester as a curing agent and which can remarkably improve the reusability of the refractory particulate material. The present invention also contemplates a sand mold for casting produced by using one of the above-mentioned compositions and a process for the production of a sand mold for casting comprising the use of one of the above-mentioned compositions.

2. Description of the Related Art

The self-hardening molding process, the Cold Box process and the Croning process (i.e., the shell process) have been known as processes for producing a mold, such as a master mold or core, by the use of an organic binder. Particularly from the standpoint of productivity, quality of castings, safety, and hygiene, the self-hardening or self-curing molding process using an organic binder instead of an inorganic binder has already become a general-purpose molding process, mainly in the field of machinery castings.

Meanwhile, the Croning process of thermally curing a particulate refractory coated with a phenolic resin, i.e., a so-called coated sand, has been also widely used as a process for producing a mold at a medium or high rate. However, the employment of the Cold Box process of conducting the curing or hardening of a mold with a gas or an aerosol at ordinary temperatures, instead of the Croning process has been earnest attempted in order to save the energy that would otherwise be consumed in the production of the mold, and improve the production rate of the mold and the qualities of the mold and the casting.

Recently, compositions for a molding sand, comprising a water-soluble phenolic resin as a binder and an organic ester as a curing agent, have been reported in U.S. RE Nos. 32812 (published on Dec. 27, 1988; Borden UK Limited) and 32720 (published on Jul. 26, 1988; Borden UK Limited) as compositions which are suitably used in the self-hardening or gas-hardening molding process, and which can improve the quality of the casting and the working atmosphere. The molding process using such a composition is advantageous in that the working atmosphere is not polluted by the sulfur dioxide gas evolved during pouring, and in that the obtained casting has few faults due to sulfur and nitrogen, because the composition does not contain sulfur or nitrogen, unlike the acid-curing type binder composition of the prior art. However, It is well known that the employment of the above-mentioned process, i.e., a process using such a composition comprising a water-soluble phenolic resin and an organic ester, is limited due to the low reclaimability of molding sand. Accordingly, the improvement of the process in these respects has been much desired. Further, the amount of the water-soluble phenolic resin, or the composition comprising the same to be used, must be increased in order to attain the necessary mold strength because the obtained mold is poor in strength when such a composition is employed. Additionally, the use of a composition comprising a water-soluble phenolic resin and an organic ester has the disadvantage that an increasing amount of the resin must be added to the sand when the amount of sand recovered for reuse or reclaimed after repeated use is large, because the production of a mold having a desirable strength becomes more difficult when the sand recovered for reuse or reclaimed after repeated use is employed. What is worse, such an increase in the resin content of a mold leads to an increase in the amount of thermal decomposition gas evolved in pouring, which introduces gas faults into the casting, and adversely affects the working atmosphere.

In order to alleviate these disadvantages even a little, for example, methods such as subjecting the used sand to severe mechanical abrasion to remove the organic substance and/or alkali remaining on the surface of the sand in preparing the sand for reuse, increasing the amount of fresh sand used, or using sand only once and then throwing it away are now generally employed. Accordingly, the rate of reclamation of sand, i.e., the rate of the used sand based on the entire sand, in the case of using the above-mentioned composition was at most about 85% ("Modern sand binders—a review; Liquid catalyst cold setting processes, Liquid ester cured alkaline phenolic binders ALPHASET", Foundry Trade Journal, 8/22, P.924, December 1989, by BRITISH CASTING IRON RESEARCH ASSOCIATION).

This disadvantage specialty in sand reclaimability in the case of using a composition comprising a water-soluble phenolic resin and an organic ester is made more apparent by comparison to the use of an acid-curing furan resin binder, which is generally used as a binder for molding the sand. When an acid-curing furan resin binder is used, the mold strength attained by using reclaimed sand is generally higher than that attained by using fresh sand, so that the amount of the binder to be added to reclaimed sand can be slightly reduced as compared with that to be added to fresh sand. Further, severe mechanical abrasion is unnecessary for the reclamation of sand, so that the rate of reclamation of sand is about 95% or above.

In the production of a mold and/or a core from the sand recovered for reuse, in which sand is bound with a binder after curing, the method for reclamation of sand and the rate of reclamation of sand are economically important factors.

The reclamation of sand from a mold and/or a core is generally conducted by taking a casting from the mold, breaking the mold and the core into pieces by mechanical oscillation or similar treatment for breaking up the mold and the core, crushing the lumps and agglomerate, and recovering the sand. The recovered sand is generally subjected to a reclamation treatment in order to remove unburned binder remaining on the surface of the sand. There are three known processes for reclaiming sand (i.e., the mechanical, wet and thermal processes).

The wet reclamation process is relatively unfavorable because of the problematic disposal of washings, and the high energy cost of drying the sand. Further, the thermal reclamation process is also relatively unfavorable because of its high energy cost. The mechanical reclamation process is most economical, so that it is most generally employed; its use is becoming more widespread in the casting industry.

The use of sand thus reclaimed, however, has the aforementioned disadvantage inherent in this process, that a binder system comprising a step of curing a water-soluble phenolic resin with an organic ester cannot provide a mold having a sufficiently high strength. This phenomenon is far different from that which occurs using an acid-curing furan resin. Accordingly, an improvement of the above-mentioned disadvantage has been earnestly desired.

As processes for improving the strength of a mold produced by the use for reclaimed sand, a process of lowering the content of solid, i.e., resin, contained in the binder composition is disclosed in Japanese Patent Laid-Open No. 262042/1989 (Oct. 18, 1989) and the corresponding European Patent Publication-A No. 336534 (Oct. 11, 1989). A process for preliminarily treating reclaimed sand with a silane solution is disclosed in Japanese Patent Laid-Open No. 262043/1989 (Oct. 18, 1989) and the corresponding European Patent Publication-A No. 336533 (Oct. 11, 1989). However, these processes do not impart a satisfactory strength to molds made from reclaimed sand, though they sometimes slightly enhance the strength of such a molds.

DISCLOSURE OF THE INVENTION

Summary of the Invention

The present inventors have extensively studied in order to solve the above-described problem and have found that the strength of a mold produced from a refractory particulate material, particularly a reclaimed refractory particulate material (hereinafter referred to as "reclaimed sand"), with a composition comprising a water-soluble phenolic resin as a binder and an organic ester as a curing agent can be remarkably enhanced by incorporating a specified amount of a specified metal element into the composition. The present invention has been accomplished on the basis of this finding.

Namely, the present invention provides a binder resin composition comprising or consisting essentially of a water-soluble phenolic resin and a compound containing a metallic element, wherein the metallic element is selected from the group consisting of elements belonging to Groups IB to VIII of the Periodic Table.

The present invention also provides a process for preparing the above-mentioned binder resin composition, wherein said compound containing said metallic element is added to a raw material composition which is used for synthesizing the water-soluble phenolic resin.

The present invention further provides a curing agent composition comprising or consisting essentially of an organic ester compound and a compound containing a metallic element, wherein the metallic element is selected from the group consisting of elements belonging to Groups IB to VIII of the Periodic Table.

The present invention provides a caking additive composition comprising or consisting essentially of a water-soluble phenolic resin, an organic ester compound and a compound containing a metallic element, wherein the metallic element is selected from the group consisting of elements belonging to Groups IB to VIII of the Periodic Table.

The present invention provides a kit comprising or consisting essentially of the above-described caking additive composition, wherein said kit comprises or consists essentially of a package (A) containing said water-soluble phenolic resin and a package (B) containing said organic ester compound, wherein said package (A) and/or package (B) further contains said compound containing said metallic element.

The present invention also provides a kit comprising or consisting essentially of the above-described caking additive composition, wherein said kit comprises or consists essentially of a package (C) containing said water-soluble phenolic resin, a package (D) containing said organic ester compound and a package (E) containing said compound containing said metallic element.

The present invention provides a casting mold composition comprising or consisting essentially of the aforementioned caking additive composition and a refractory granular material.

The present invention provides a casting mold comprising or consisting essentially of a cured resin, which is obtained by curing a water-soluble phenolic resin with an organic ester compound in the presence of a compound containing a metallic element, and a refractory granular material, wherein the metallic element is selected from the group consisting of elements belonging to Groups IB to VIII of the Periodic Table.

The present invention further provides a process for manufacturing a casting mold by curing a water-soluble phenolic resin with an organic ester compound in the presence of a compound containing a metallic element and a refractory granular material, wherein the metallic element is selected from the group consisting of metals belonging to Groups IB to VIII of the Periodic Table.

The present invention further includes the following embodiments:

(1) A binder resin composition for a mold which is used in a process for producing a mold by curing a water-soluble phenolic resin with an organic ester compound, characterized in that at least one of Group IB to VIII metal element of the periodic table is contained in the resin or the binder resin composition.

(2) A binder resin composition for a mold which is used in a process for producing a mold by curing a water-soluble phenolic resin with an organic ester compound, characterized in that the binder resin composition is prepared by incorporating the metal element into the resin or the binder resin composition in the step of preparing the resin.

(3) A curing agent composition for a curing mold, containing an organic ester compound and a Group IB to VIII metal of the periodic table, or a compound thereof.

(4) A caking additive composition for a curing mold, containing the above-described binder resin composition and an organic ester compound.

(5) A casting mold composition, the above-described caking additive composition for a curing mold and a refractory aggregate, i.e., a refractory granular material.

(6) A process for the production of a mold, characterized by using the above-described caking additive composition for a curing mold.

(7) A process for the production of a mold, characterized by molding a refractory particulate material with the above-described curing agent composition for a curing mold.

Further scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The compound containing a specified metallic element according to the present invention contains therein at least one element selected from the group consisting of elements belonging to Group IB to VIII of the Periodic Table. Namely, the compound comprises one or more metallic element(s) selected from among Cu and Ag (Group IB), Mg, Ca, Sr and Ba (Group IIA), Zn and Cd (Group IIB), Sc and Y (Group IIIA), Al, Ga, In and Tl (Group IIIB), Ti, Zr and Hf (Group IVA), Sn and Pb (Group IVB), V, Nb and Ta (Group VA), Bi (Group VB), Cr, Mo and W (Group VIA), Po (Group VIB), Mn, Tc and Re (Group VIIA) and Fe, Co and Ni (Group VIII).

The compounds containing the metallic element to be used in the present invention may take any form selected from among powdered metal (in which the metal is a simple substance or a metal alloy), metal oxide, metal hydroxide, metal salt of an inorganic acid, metal salt of an organic acid, a metal complex, and so on. That is, in the present invention, the form of the compound containing the metallic element (hereinafter referred to simply as "the metallic compound") is not limited at all. Specific examples of the metallic compounds are described below, however though the metallic compounds encompassed by the present invention are not limited to those which will be mentioned.

In the case where the metallic compound according to the present invention is used in a powdery form, i.e., in the form of a powdered metal, as the metallic element contained in the metallic compound, Cu and Ag (Group IB), Mg, Ca, St, Ba, Zn and Cd (Group II), Al, Sc and Ga (Group III), Ti, Zr and Sn (Group IV), Sb and Bi (Group V), Cr and Mo (Group VI), Mn and Tc (Group VII) and Fe, Co and Ni (Group VIII) are cited. Elements called metalloids such as B, Si, As and Te are undesirable. Further, the metal alloy to be used in a powdery form includes duralumin, magnalium and ferro-manganese.

Representative forms of the metallic compound according to the present invention include salts, double salts, hydroxides, oxides, organometallic compounds, wherein the metal atom is bonded to a hydrocarbon group such as an alkyl group and an aryl group, nitrides, alkoxides, hydrides, carbides, metal imides, peroxides, sulfides, phosphides, nitrites, anilides, phenolares, hexaammine complexes (hexaammoniates), ferrocene and its analogues, dibenzenechromium and its analogues, inorganic heteropolymers, metal carbonyl, metal-containing enzymes, clathrate compounds, metal thelares and metal chelate polymers.

The double salt includes alums and its analogues represented by the general formula (I):

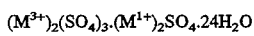

$$(M^{3+})_2(SO_4)_3 \cdot (M^{1+})_2 SO_4 \cdot 24 H_2 O \qquad (I)$$

wherein the trivalent metal corresponding to $M^{3+}$ includes Al, V, Mn and Fe and the monovalent metal corresponding to $M^{1+}$ includes Na and K. Examples of the double salt include potassium alum and ammonium alum.

A representative structure of the salts, hydroxides and oxides containing one or more of metallic elements belonging to Group IB to VIII of the Periodic Table is represented by the following general formula (II):

$$M_a X_b \qquad (II)$$

wherein M represents a metallic element selected from the group consisting of elements belonging to Group IB to VIII of the Periodic Table; X represents an oxygen atom, a hydroxyl group, or an anionic atomic group of an inorganic or organic acid or an acid having sequestering properties; and a and b are each an integer of 1 or above.

Examples of M in general formula (II) include, as in the case of the powdered metal, Cu and Ag (Group IB), Mg, Ca, Sr, Ba, Zn and Cd (Group II), Al, Sc and Ga (Group III), Ti, Zr and Sn (Group IV), Sb and Bi (Group V), Cr and Mo (Group VI), Mn and Tc (Group VII) and Fe, Co and Ni (Group VIII), but elements called metalloids such as B, Si, As and Te are undesirable.

Specific examples of X in general formula (II) include an oxygen atom, a hydroxyl group, an anionic atomic group of an inorganic acid, such as halides ($F^-$, $Cl^-$ and $Br^-$) $SO_4^{2-}$, $SO_3^{2-}$, $S_2O_3^{2-}$, $S_2O_6^{2-}$, $SiF_6^{2-}$, $MoO_4^{2-}$, $MnO_4^{2-}$, $NO_3^-$, $NO_2^-$, $ClO_3^-$, $ClO^-$, $CO_3^{2-}$, $HCO_3^-$, $CrO_4^{2-}$, $IO_3^-$, $PO_3^-$, $PO_4^{3-}$, $HPO_3^{2-}$, $HPO_4^{2-}$, $H_2PO_4^-$, $P_2O_7^{4-}$, $H_2PO_2^-$, $SiO_3^{2-}$, $BO_2^-$, $BO_3^{3-}$, $B_4O_7^{2-}$, $Al(OH)_6^{3-}$ and $Fe(CN)_6^{4-}$ and an anionic atomic group of an organic acid, such as anionic atomic groups of carboxylic acids, e.g., formic acid, acetic acid, oxalic acid, tartaric acid and benzoic acid; anionic atomic groups of organic sulfonic acids, e.g., sulfamic acid, xylenesulfonic acid, toluenesulfonic acid, phenolsulfonic acid, benzenesulfonic acid and alkylbenzenesulfonic acid; and anionic atomic groups of organic phosphoric acids, e.g., methylphosphoric acid and ethylphosphoric acid.

Representative examples of the salts, hydroxides and oxides to be used in the present invention are as follows:

Examples of the salts include calcium chloride, magnesium chloride, barium chloride, copper chloride, zinc chloride, calcium bromide, aluminum fluoride, vanadium chloride, molybdenum chloride, manganese chloride, iron chloride, nickel chloride, calcium sulfate, calcium carbonate, magnesium phosphate, calcium phosphate, aluminum chloride, tin chloride, calcium formate, magnesium oxalate, calcium toluene-sulfonate, magnesium acetate, zinc acetate, aluminum acetate and magnesium aluminate.

Examples of the hydroxides include aluminum hydroxide, calcium hydroxide, magnesium hydroxide and zinc hydroxide.

The oxides include magnesium oxide, calcium oxide, barium oxide, zinc oxide and aluminum oxide. Further, double compounds comprising two or more of these oxides or those comprising one of the oxides and an oxide or salt of other element can also be favorably used in the present invention.

The double compounds to be used in the present invention will now be described in detail.

Representative examples thereof include cements such as hydraulic lime, Roman cement, natural cement, Portland cement, alumina cement, Portland blast-furnace slag cement, silica cement, fly ash cement, masonry cement, expansive cement and special cement; and blast furnace slags such as steelmaking slag, magnesium smelting slag, ferrochrome slag and bentonite. Chemical structures of representative double compounds are represented by; $mCaO.nSiO_2$, $mCaO.nAl_2O_3$, $mBaO.nAl_2O_3$, $CaO.mAl_2O_3.nSiO_2$, $CaO.mMgO.nSiO_2$, $mCaCO_3.nMgCO_3$, or $mCaO.nFe_2O_3$. $lCaO.mAl_2O_3.nFe_2O_3$ (wherein l, m and n are each 0 or an integer of 1 or above).

The oxides or double compounds to be used in the present invention further include other clayish materials, iron oxide materials and other mineral materials. When such an oxide is used, it is preferable that the oxide have a particle diameter as small as possible. That is, the mean particle diameter thereof is generally 200 μm or below, preferably 50 μm or below.

The organometallic compounds, in which a metal atom belonging to Group IB to VIII of the Periodic Table is bonded to a hydrocarbon group such as an alkyl group and an aryl group include $Al(CH_3)_3$, $Al(C_2H_5)_3$, $Al(C_6H_5)_3$, $(C_2H_5)_2AlI$, $(C_2H_5)_2AlH$, $(C_2H_5)_2AlCN$, $Al(i-C_4H_9)_3$, $(CH_2=CH)_3Al$, $Zn(C_6H_5)_2$, $(CH_2=CH)_2Zn$, $Ca(C_2H_5)_2$ and Grignard reagents represented by the formula: R—Mg—X (wherein R is an alkyl group or an aryl group and X is a halogen atom).

The alkoxides containing a metallic element belonging to Group IB to VIII of the Periodic Table include $Al[OCH(CH_3)_2]_3$ and $Zn(OCH_3)_2$.

The hydrides containing a metallic element belonging to Group IB to VIII of the Periodic Table include $AlH_3$, $CaH_2$ and $BaH_2$.

The carbides containing a metallic element belonging to Group IB to VIII of the Periodic Table include $Al_4C_3$ and $CaC_2$.

The metal imides containing a metallic element belonging to Group IB to VIII of the Periodic Table include $Ca(NH_2)_2$.

The peroxides containing a metallic element belonging to Group IB to VIII of the Periodic Table include $CaO_2$, $BaO_2$ and $BaO_4$.

The sulfides containing a metallic element belonging to Group IB to VIII of the Periodic Table include $ZnS$, $Cu_2S$ and $CuS$.

The phosphides containing a metallic element belonging to Group IB to VIII of the Periodic Table include $AlP$.

The nitrites containing a metallic element belonging to Group IB to VIII of the Periodic Table include $CuNO_2$.

The anilides containing a metallic element belonging to Group IB to VIII of the Periodic Table include $Al(NHPh)_3$.

The phenolares containing a metallic element belonging to Group IB to VIII of the Periodic Table include aluminum phenolate, zinc phenolate and calcium phenolate.

The hexaammine complexes, i.e., hexaammonlates, containing a metallic element belonging to Group IB to VIII of the Periodic Table include $Ca(NH_3)_6$.

The ferrocenes and its analogues containing a metallic element belonging to Group IB to VIII of the Periodic Table include ferrocene, i.e., $Fe(C_5H_5)_2$, $Zn(C_5H_5)_2$, $Ni(C_5H_5)_2$, $Mn(C_5H_5)_2$ and $V(C_5H_5)_2$.

The dibenzenechromium and its analogues containing a metallic element belonging to Group IB to VIII of the Periodic Table include $Cr(C_6H_6)_2$, $Mo(C_6H_6)_2$ and $V(C_6H_6)_2$.

The inorganic heteropolymers containing a metallic element belonging to Group IB to VIII of the Periodic Table include inorganic hydride heteropolymers such as beryllium hydride polymer, magnesium hydride polymer and aluminum hydride polymer; and inorganic polymers such as aluminum nitride containing Al—N bonds.

The inorganic compounds containing a metallic element belonging to Group IB to VIII of the Periodic Table include aluminosilicates such as zeolite, analcite and natrolite; layer silicates such as mica; and aluminum phosphate and hydrotalcite.

The clathrate compounds containing a metallic element belonging to Group IB to VIII of the Periodic Table include complexes of these metallic elements with cyclic polyethers (crown ethers), cyclic polyamines (azacrown compounds), cyclic polythia ethers (thiacrown compounds), composite donor crown compounds, heterocyclic crown compounds (cryptand), polymeric crown compounds, cyclic phenolic resin (calixarene) and cyclodextrin derivatives, for example, $Ca^{2+}$ complex of dibenzo-18-crown-6 and $Ca^{2+}$ complex of cryptand [2.2.2].

The metal complexes containing a metallic element belonging to Group IB to VIII of the Periodic Table include complexes each of which has a coordination number of 2 to 8 and comprises the metallic element and a ligand selected from among anionic ligands such as $Cl^-$, $CN^-$, $NCS^-$, $SO_4^{2-}$, $NO^{2-}$, $NO_3^-$, $CH_3COO^-$, $C_2O_4^{2-}$, $CO_3^{2-}$, $OH^-$, $H_2N.CH_2COO^-$, $F^-$, $Br^-$, $ONO^-$, $I^-$, $NH^{2-}$ and $SCN^-$; neutral ligands such as $H_2N.CH_2CH_2.NH_2$, $C_6H_5N$, $NH_3$ and $H_2O$; and cationic ligands such as $H_2N.NH_3^+$ and $H_2N.CH_2CH_2.NH_3^+$. Specific examples thereof include $[Al(C_2O_4)_3]Cl_3$ and $[Zn(NH_3)_6]Cl_2$.

Further, the compounds containing a metallic element belonging to Group IB to VIII of the Periodic Table include metal carbonyls such as $Ni(CO)_4$ and $Mn_2(CO)_{10}$; metal-containing enzymes such as carboxypeptidase A and thermolysin; and zircoaluminum compounds.

Further, a metal chelate (or a sequestering compound) comprising a metallic element belonging to Group IB to VIII of the Periodic Table and a chelating agent (or a sequestering agent) may be used in the present invention.

Representative examples of the chelating agent include aminoacetic acids and salts thereof such as ethylenediaminetetraacetic acid (EDTA) and its salts, nitrilotriacetic acid (NTA) and its salts, trans-1,2-cyclohexanediaminetetraacetic acid (CyDTA) and its salts, diethylenetriaminepentaacetic acid (DTPA) and its salts, triethylenetetraminehexaacetic acid (TTHA) and its salts, glycol ether diamine-tetraacetic acid (GEDTA) and its salts, iminodiacetic acid (IDA) and its salts, polyalkylenediaminetetra-acetic acid and its salts and N-hydroxyalkylene-iminodiacetic acid and its salts; phenylamino-carboxylic acids and salts thereof such as 2-oxyphenyliminodiacetic acid and its salts, phenyliminodiacetic acid and its salts, 2-oxybenzyliminodiacetic acid and its salts, benzyliminodiacetic acid and its salts and N,N'-ethylenebis-[2-(o-hydroxy-phenyl)]glycine and its salts; mercapto-containing aminocarboxylic acids and salts thereof such as β-mercaptoethyliminodiacetic acid and its salts; ether linkage-containing aminocarboxylic acids and salts thereof such as ethyl ether diaminetetraacetic acid and its salts; thio ether linkage-containing aminocarboxylic acids and salts thereof such as ethyl thio ether diaminetetraacetic acid and its salts; aminocarboxylic acids having a sulfonic acid group and salts thereof represented by β-aminoethylsulfonic acid-N,N-diacetic acid and its salts; aminocarboxylic acids having a phosphonic acid group and salts thereof such as nitrilotriacetic acid-methylenephosphonic acid and its salts; peptide linkage-containing aminocarboxylic acids and salts thereof such as N,N'-diglycylethylenediamine-N',N'',N''',N''''-tetraacetic acid and its salts; hydroxycarboxylic acids and salts thereof such as gluconic acid and its salts, citric acid and its salts, and tartaric acid and its salts; phosphorus acids and salts thereof such as tripolyphosphoric acid and Its salts, hydroxyethanediphosphonic acid (HEDP) and its salt, and nitrilotristyrenephosphonic acid (NTP) and its salts; and acetylacetone.

Further, a metal chelate polymer comprising a metallic element belonging to Group IB to VIII of the Periodic Table and a coordination polymer may be used in the present invention.

Representative examples of the coordination polymer include polymers containing at least one member selected from among an amino group, a nitrogenous heteroring, a Schiff base, an alcohol, a carboxylic acid, a ketone, an ester, an amide, an aminocarboxylic acid, a phosphonic acid, a phosphinic acid and a thiol in the molecule.

Among the metallic compounds described above, a compound comprising a metallic element belonging to Group II to VIII of the Periodic Table is desirable, a compound comprising a metallic element belonging to Group II, III and IV of the Periodic Table is more desirable, and a compound comprising a metallic element selected from the group consisting of Zn, Ca, Mg, Al and Zr is most desirable.

The water-soluble phenolic resin, that is an alkaline phenolic resin, to be used in the present invention can be cured with an organic ester compound. The water-soluble phenolic resin is prepared, for example, by reacting a phenol such as phenol, cresol, resorcinol, 3,5-xylenol, bisphenol A and other substituted phenols with an aldehyde such as formaldehyde, acetaldehyde, furylaldehyde or a mixture of them in a large amount of an aqueous solution of an alkaline substance. Therefore, the water-soluble phenolic resin contains a phenolate portion in the molecule. In the preparation of the water-soluble phenolic resin, other monomer(s) which is condensable with formaldehyde, such as urea, melamine and cyclohexanone may be condensed with the components described above in such an amount that the monomer(s) does not become the main constituent. The resin may have either a methylene linkage type structure or a benzyl ether type structure.

A suitable alkaline substance that is an alkaline catalyst, to be used in the preparation of such a water-soluble phenolic resin includes alkali metal hydroxides such as sodium hydroxide, potassium hydroxide, lithium hydroxide and mixtures thereof, among which potassium hydroxide is most desirable.

The organic ester compound to be used in the present invention includes lactones and organic esters which are obtained by reacting a monohydric or polyhydric alcohol having 1 to 10 carbon atoms with an organic carboxylic acid having 1 to 10 carbon atoms, which may be used either alone or as a mixture. In a self-hardening mold process, the use of γ-butyrolactone, propiolactone, ε-caprolactone, ethyl formate, ethylene glycol diacetate, ethylene glycol monoacetate or triacetin is desirable, while in a gas-hardening mold process, the use of methyl formate is desirable.

The present invention provides a binder resin composition comprising the above-mentioned water-soluble phenolic resin and the above-mentioned compound containing the above-mentioned metallic element, that is a metallic compound.

The binder resin composition contains the metallic compound in an amount preferably from 0.0005 to 5% by weight, still preferably 0.001 to 3% by weight in terms of the metallic element, and based on the weight of the water-soluble phenolic resin. If the content of the metallic compound is lower than 0.0005% by weight, the effect of the present invention will not be exhibited sufficiently, while if it exceeds 5% by weight, no additional effect will be attained.

The binder resin composition generally shows a solid content of from 40 to 50% by weight. In the binder resin composition, the solid content shows the amount of the water-soluble phenolic resin only or the total amount of the water-soluble phenolic resin and a silane coupling agent, substantially.

The metallic compound is, for example, dissolved, dispersed or emulsified in the binder resin composition.

The binder resin composition is prepared by mixing the water-soluble phenolic resin with the metallic compound and other component(s), if necessary. However, a metal-containing water-soluble phenolic resin is preferably employed, and sometimes, the metal-containing water-soluble phenolic resin per se is a binder resin composition according to the present invention. The metal-containing water-soluble phenolic resin is prepared by adding the metallic compound in any step of the preparation of the water-soluble phenolic resin. Namely, the metal-containing water-soluble phenolic resin can be prepared by preparing a mixture of the metallic compound with a phenol and an aldehyde as raw materials of the water-soluble phenolic resin and polycondensing the phenol with the aldehyde in the presence of the metallic compound and a large amount of an alkaline substance, or by adding the metallic compound in the step where the polycondensation of the phenol with the aldehyde proceeds to some extent.

The present invention also provides a process for preparing the binder resin composition, wherein the above-described metallic compound is added to a raw material composition which is used for synthesizing the above-described water-soluble phenolic resin.

The binder resin composition of the present invention may contain a conventional silane coupling agent. Preferred specific examples of the silane coupling agent include γ-aminopropyltriethoxysilane, γ-(2-aminoethyl)aminopropyltrimethoxysilane and γ-glycidoxypropyltrimethoxysilane.

The present invention provides a curing agent composition comprising the above-mentioned organic ester compound and the above-mentioned compound containing the above-mentioned metallic element, that is a metallic compound.

The content of the metallic compound in the curing agent composition is preferably from 5 to 200000 ppm, still preferably from 20 to 100000 ppm in terms of the metallic element, and based on the weight of the organic ester compound. If the content of the metallic compound is lower than 5 ppm, the effect of the present invention will not be exhibited sufficiently, while if it exceeds 200000 ppm, no additional effect will be attained.

The curing agent composition is prepared by mixing the organic ester compound with the metallic compound and other component(s), if necessary. The metallic compound is, for example, dissolved, dispersed or emulsified in the curing agent composition.

The curing agent composition of the present invention may contain a conventional silane coupling agent. Preferred specific examples of the silane coupling agent include those which are described according to the binder resin composition.

The present invention provides a caking additive composition comprising the above-described water-soluble phenolic resin, the above-described organic ester compound and the above-described metallic compound.

The content of the metallic compound in the caking additive composition is preferably from 0.0005 to 5% by weight, still preferably 0.001 to 3% by weight in terms of metallic element, based on the weight of the water-soluble phenolic resin, or, preferably from 5 to 200000 ppm, still preferably from 20 to 100000 ppm in terms of the metallic element, and based on the weight of the organic ester compound. The content of the organic ester compound in the caking additive composition is preferably from 0.6 to 5000 parts by weight, still preferably 4 to 2000 parts by weight based on 100 parts by weight of the water-soluble phenolic resin.

The caking additive composition of the present invention may contain a conventional silane coupling agent. Preferred specific examples of the silane coupling agent include those which are described according to the binder resin composition.

The caking additive composition is used for a self-hardening mold process or a gas-hardening mold process in which the setting or curing step is conducted at ordinary temperatures. Therefore, the caking additive composition is generally provided as a kit, comprising two or more of packages each of which contains a different component.

An example of such a kit according to the present invention is a kit (X) comprising the above-described caking additive composition, wherein said kit comprises package (A) containing the above-described water-soluble phenolic resin and package (B) containing the above-described organic ester compound, and package (A) and/or package (B) further containing the above-described metallic compound. Another example is a kit (Y) comprising the above-described caking additive composition, wherein said kit comprises package (C) containing the above-described water-soluble phenolic resin package (D) containing the above-described organic ester compound and package (E) containing the above-described metallic compound.

When such a kit is used for a self-hardening mold process, package (A) and package (B) are mixed with each other (kit (X)), or, package (C), package (D) and package (E) are mixed together (kit (Y)).

When such a kit is used for a gas-hardening mold process, package (B) is used in an aerosol state (kit (X)); or, package (D) or a mixture of package (D) and package (E) is used in an aerosol state (kit (Y)).

In the production of a sand mold for casting with the binder resin composition, the curing agent composition, the caking additive composition or the kit according to the present invention in a self-hardening mold process or a gas-hardening mold process, any conventional process may be employed.

In the manufacture of a casting mold, it has not been known at all that the strength of the casting mold comprising reclaimed sand can be remarkably enhanced by using the above-described metallic compound, i.e., by using the above-described binder resin composition, the above-described curing agent composition, the above-described caking additive composition or the above-described kit according to the present invention.

Meanwhile, it has been known that some metal ions are useful as a catalyst for forming a benzyl ether linkage between the phenolic nuclei of phenols at the o-position. For example, U.S. Pat. No. 3,485,797 (published on Dec. 23, 1969; ASHLAND OIL INC.) and Japanese Patent Publication Nos. 15797/1979 (published on Jun. 18, 1979; COR TECH RESEARCH LTD.) and 23769/1985 (published on Jun. 10, 1985; SUMITOMO BAKELITE K.K.) disclosed Group II elements and transition elements as such metal ions.

According to these known techniques, however, the metallic elements are used as a catalyst for causing the formation of a resol or benzyl ether, and the obtained resol resin is one which should fall into the category of thermosetting solid resol resins, which are quite different from the water-soluble phenolic resin according to the present invention, with respect to both the field of application and the curing mechanism. That is, in the present invention, an organic ester compound used as a curing agent is hydrolyzed in a caking additive composition exhibiting strong alkalinity to thereby cure the water-soluble phenolic resin, which is far different from the curing mechanism of the solid resol resin described above. In fact, when an organic ester compound is added to the resins described in the above Patent documents, no curing occurs due to poor alkalinity. Accordingly, the techniques described are not applicable to the present invention.

The present invention further provides a casting mold composition comprising the aforementioned caking additive composition and a refractory granular material.

The refractory granular material to be used in the present invention includes silica sand comprising quartz as a main component, chromite sand, zircon sand, olivine sand and alumina sand. Although the refractory granular material to be used in the present invention may be either a fresh one or a recovered (or reclaimed) one, the effect of enhancing the mold strength according to the present invention is remarkable, particularly when a recovered or reclaimed sand is used. Therefore, it is preferable that a refractory granular material mainly comprising a recovered or reclaimed sand for reuse is employed. When recovered or reclaimed sand is used, the reclamation process is not particularly limited though a molding sand is generally reclaimed by abrasion or roasting.

The casting mold composition according to the present invention comprises preferably from 0.2 to 7.5 parts by weight, still preferably from 0.3 to 2.5 parts by weight, based on 100 parts by weight of the refractory granular material, of said water-soluble phenolic resin; preferably from 0.05 to 9 parts by weight, still preferably from 0.1 to 5.0 parts by weight, based on 100 parts by weight of the refractory granular material, of said organic ester compound; preferably from 0.0001 to 10 parts by weight, still preferably from 0.0001 to 3 parts by weight (in terms of the metallic element), based on 100 parts by weight of the refractory granular material, of said metallic compound; and water.

The casting mold composition according to the present invention comprises preferably from 0.001 to 1 parts by weight, still preferably from 0.002 to 0.5 parts by weight, based on 100 parts by weight of the refractory granular material, of a silane coupling agent.

The present invention provides a casting mold comprising a cured resin which is obtained by curing the above-mentioned water-soluble phenolic resin with the above-mentioned organic ester compound in the presence of the above-mentioned metallic compound, and a refractory granular material.

As the refractory granular material, those mainly compositing a recovered (or reclaimed) sand for reuse are advantageoulsy used, because the effect of enhancing the mold strength according to the present invention is remarkable, particularly when a recovered or reclaimed sand is used.

The cured resin is obtained by curing the above-mentioned water-soluble phenolic resin with the above-mentioned organic ester compound in the presence of the above-mentioned metallic compound. Therefore, the term "cured resin" means those which comprise the specified resin and the metallic element constituting the metallic compound.

The cured resin is present on the surface of the refractory granular material.

The present invention provides a process for manufacturing a casting mold by curing the above-mentioned water-soluble phenolic resin with the above-mentioned organic ester compound in the presence of the above-mentioned metallic compound and the above-mentioned refractory granular material.

For conducting the process, the use of the binder resin composition, the curing agent composition, the caking additive composition, the kit or the casting mold composition is preferred.

In the self-hardening mold process, a sand mold, i.e., a casting mold can be produced, for example, by mixing 100 parts by weight of reclaimed sand with preferably from 0.0001 to 10 parts by weight, still preferably from 0.0001 to 3 parts by weight (in terms of the metallic element) of said metallic compound, preferably from 0.05 to 9 parts by weight, still preferably from 0.1 to 5 parts by weight of an organic ester compound as a curing agent, preferably from 0.2 to 7.5 parts by weight, still preferably from 0.3 to 2.5 parts by weight of a water-soluble phenolic resin, and water by a conventional process and forming the obtained mixture into a mold by a conventional self-hardening mold process. In general, the water-soluble phenolic resin and water are added simultaneously. Namely, they are added as a binder resin composition comprising from 40 to 50% by weight of the water-soluble phenolic resin or the water-soluble phenolic resin and a silane coupling agent in such an amount that the sum of them (i.e., the solid content) is from 40 to 50% by weight. Therefore, from about 0.4 to 15 parts by weight of the binder resin composition is added to 100 parts by weight of reclaimed sand.

In the gas-hardening mold process, a sand mold, can be produced, for example, by mixing 100 parts by weight of reclaimed sand with preferably from 0.0001 to 10 parts by weight, still preferably from 0.0001 to parts by weight (in terms of the metallic element) of said metallic compound, preferably from 0.2 to 7.5 parts by weight, still preferably from 0.3 to 2.5 parts by weight of a water-soluble phenolic resin, and water by a conventional process, incorporating the obtained mixture into another mold for a casting mold by the conventional gas-hardening mold process, and blowing preferably from 0.05 to 9 parts by weight, still preferably from 0.1 to 5 parts by weight of an organic ester compound, which is an aerosol, as a curing agent. In general, the water-soluble phenolic resin and water are added simultaneously. The metallic compound may be flown with the organic ester compound.

In the process for molding a refractory granular material into a sand mold for casting, the strength of such a mold made from reclaimed sand can be remarkably improved by using the binder resin composition, the curing agent composition, the caking additive composition, the kit, the casting mold composition or the process for manufacturing a casting mold, according to the present invention.

EXAMPLES

The present invention will now be described in detail by referring to the following Examples, though the present invention is not limited to them.

Synthesis Example 1 (Preparation Example 1 of a binder resin composition)

255 parts by weight of water, 267 parts by weight of phenol and 34 parts by weight of magnesium ethylenediaminetetraacetate were fed into a four-necked flask fitted with a stirrer, a reflux condenser and a thermometer, heated on a water bath under stirring, and maintained at 85° C. for 30 minutes. 282 parts by weight of 48 wt. % potassium hydroxide aqueous solution was added into the flask, followed by the addition of 158 parts by weight of 92% (purity) paraformaldehyde in one hour. The reaction was continued at the same temperature. When the viscosity of the resin solution reached 100 cps at 25° C., the reaction mixture was cooled, followed by the addition of 4.0 g of γ-aminopropyltriethoxysilane. A resin solution, i.e., a binder resin composition, containing 1931 ppm of elementary magnesium (solid content: 49 wt. %, weight-average molecular weight of the synthesized resin: 2300) was obtained.

Synthesis Example 2 (Preparation Example 2 of a binder resin composition)

263 parts by weight of water, 275.5 parts by weight of phenol and 291 parts by weight of 48 wt. % potassium hydroxide aqueous solution were fed into a four-necked flask fitted with a stirrer, a reflux condenser and a thermometer, heated on a water bath under stirring, and maintained at 85° C. 163 parts by weight of 92% (purity) Dataformaldehyde was added into the flask in one hour. The reaction was continued at the same temperature. When the viscosity of the resin solution reached 100 cps at 25° C., the reaction mixture was cooled, followed by the addition of 3.5 parts by weight of zinc chloride and 4 parts by weight of γ-aminopropyltriethoxysilane. A resin solution containing 1983 ppm of elementary zinc (solid content: 49 wt. %, weight-average molecular weight of the synthesized resin: 2300) was obtained.

Synthesis Example 3 (Preparation Example 3 of a binder resin composition)

264 parts by weight of water, 277 parts by weight of phenol and 292 parts by weight of 48 wt. % potassium hydroxide aqueous solution were fed into a four-necked flask fitted with a stirrer, a reflux condenser and a thermometer, heated on a water bath under stirring, and maintained at 85° C. 163 parts by weight of 92% (purity) paraformaldehyde was added into the flask in one hour. The reaction was continued at the same temperature. When the viscosity of the resin solution reached 100 cps at 25° C., the reaction mixture was cooled followed by the addition of 4 parts by weight of γ-aminopropyl-triethoxysilane. A resin solution (solid content: 49 wt. %, weight-average molecular weight of the synthesized resin: 2300) was obtained.

The determination of the content of the metallic compound, in terms of the metallic element, in the above-described binder resin compositions was conducted as follows:

A binder resin composition was sufficiently mixed by stirring and 0.5 to 0.8 g of the composition was weighed onto a 100-ml platinum dish. 10 ml of concentrated nitric acid was added thereto to conduct acid decomposition, followed by weak thermal decomposition. 10 ml of concentrated perchloric acid was added to the decomposition mixture and the obtained mixture was subjected to white fuming treatment to reduce the amount of the mixture to 3 ml. The resulting mixture was cooled by allowing to stand, followed by the addition of 10 ml of HCl (1+1) and 10 ml of H$_2$O, i.e., HCl 5 ml +H$_2$O 15 ml. The obtained mixture was heated to conduct dissolution. The resulting mixture was filtered through a filter paper No. 5C and the filter cake was washed with dilute hydrochloric acid and hot water. The residue remaining on the filter was washed at 900° to 1000° C. in a 30-ml platinum crucible and cooled by allowing to stand. 2 g of potassium pyrosulfate was added to the ash to conduct acid melting at 800° C. To the obtained melt, 15 ml of water was added and the resultant mixture was heated to solution. Then, the obtained solution was combined with the filtrate recovered above, followed by the adjustment of the total volume to 100 ml with water with a measuring flask. The amount of the metal in the obtained solution was determined by the ICP (inductively coupled plasma emission spectrochemical analysis) method.

The determination of the weight-average molecular weight of the synthesized resins in the above-described binder resin compositions was conducted as follows:

(a) A sample was dissolved in suitable amount of water, followed by neutralizing with diluted sulfuric acid. The resulting mixture containing a precipitate was filtered, and the filter cake was washed with water and then dried. The resulting solid was dissolved in tetrahydrofuran to use as a sample for gel permeation chromatography.

(b) Column (manufactured by Shimadzu Seisakusho Co. Ltd.)

Guard Column: Shim-pack GPC-800P (4.8 mmφ×1.0 cm)

Column for determination: Shim-pack GPC-801, GPC-802 and GPC-804 (8.0 mmφ×80 cm)

Connection: Guard Column, Shim-pack GPC-804, GPC-802 and GPC-804 were connected in this order from injection part side to the other side.

(c) Reference material polystyrene (manufactured by Tohsoh Co. Ltd.)

(d) Eluate tetrahydrofuran, flow rate: 1 ml/min (pressure: 40 to 70 kg/cm$^2$)

(e) Column temperature

40° C.

(f) Detection

RI (g) Share method for calculation of molecular weight time sharing (10 sec)

Examples 1 to 20

In a similar manner to that of Synthesis Example 1, metal-containing resin solutions, i.e., binder resin compositions, were prepared with the proviso that the metallic compounds listed in Table 1 were used instead of magnesium ethylenediamine-tetraacetate in such amounts that the metal contents (in terms of metallic element) of the resin solutions were as described in Table 1.

Examples 21 to 34

In a similar manner to that of Synthesis Example 2, metal-containing resin solutions were prepared with the proviso that the metallic compounds listed in Table 2 were used instead of zinc chloride in such amounts that the metal contents (in terms of metallic element) of the resin solutions were as described in Table 2.

Comparative Example 1

In a similar manner to that of Synthesis Example 3, a resin solution was prepared.

Comparative Example 2

In a similar manner to that of the Example of Japanese Patent Laid-Open No. 262042/1989, a water-soluble phenolic resin solution (solid content: 40 wt. %) was prepared. Namely, to the water-soluble phenolic resin ALpHASET TPA-30 (an organic ester curable phenolic resin product of Borden Inc.), water was added in such an amount that the solid content was to be 40 wt. %.

Comparative Example 3

In a similar manner to that of the Synthesis Example 3, a resin solution was prepared. Further, as a refractory granular material, treated sand (See the Example of Japanese Patent Laid-Open No. 262043/1989) was used.

Test pieces for pressure testing were prepared by using the above-described resin solutions, triacetin as a curing agent, and reclaimed sands described below, and were examined with respect to their change in pressure resistance with time.

The process for the preparation of reclaimed sand-1 (for Examples 1 to 34 and Comparative Examples 1 and 2) is described below.

FC-250 (Sand/Metal=3.5) was cast with a mold produced from a mixture comprising 100 parts by weight of new Freemantie silica sand, 0.375 part by weight of triacetin as a curing agent and 1.5 parts by weight of a water-soluble phenolic resin solution (solid content: 49 wt. %, weight-average molecular weight of the phenolic resin: 2300) containing 0.54 by weight (based on the phenolic resin) of γ-aminopropyltriethoxysilane. The sand was recovered from the mold, crushed and reclaimed with an M-type rotary claimer (mfd. by Japan Casting Co., Ltd.) (A reclamation, two passes). The reclaimed sand obtained by repeating these steps five times was used in the above determination of mold strength.

The Process for the preparation of reclaimed sand-2 (for Comparative Example 3) is described below.

Reclaimed sand, which was obtained by the process for the preparation of reclaimed sand-1, was treated in a similar manner to that of the Example of Japanese Patent Laid-Open No. 262043/1989. Specifically, 100 parts by weight of reclaimed sand was treated with 0.024 part by weight of a 40 wt. % aqueous solution of γ-aminopropyltriethoxysilane at 25° C. Methods for preparing test piece for pressure test and for the determination of mold strength are described below.

A mixture comprising 100 parts by weight of reclaimed sand described above, 0.375 part by weight of triacetin and 1.5 parts by weight of each of the water-soluble phenolic resin solutions (solid content: 49 wt. %, weight-average molecular weight of the phenolic resin: 2300) prepared in the Examples and the Comparative Examples was poured into a mold for the test piece having a size of 50 mmφ×50 mmh. From immediately after the mixture was poured into the mold to 24 hours thereafter, the obtained test piece was examined for changes in pressure resistance with time. The sand temperature was 25° C., and the humidity was 60%RH. The pressure resistances determined at 24 hours after each mixture was poured into the mold are given in Tables 1 and 2.

TABLE 1

| | Metallic compound | Metal content (ppm) | Pressure resistance (kg/cm$^2$) sand temp.: 25° C. humidity: 60% RH after 24 hrs. |
|---|---|---|---|
| Example | | | |
| 1 | CuCl$_2$.2H$_2$O | 2,000 | 13.2 |
| 2 | MgCl$_2$ | 1,000 | 32.1 |
| 3 | EDTA.Na$_2$Mg | 10,000 | 31.5 |
| 4 | C$_2$H$_5$MgBr | 250 | 30.7 |
| 5 | calcium acetate | 6,000 | 33.4 |
| 6 | calcium gluconate | 1,500 | 30.2 |
| 7 | BaCl$_2$ | 3,000 | 18.6 |
| 8 | ZnCl$_2$ | 50 | 30.2 |
| 9 | NTA.NaZn | 200 | 33.3 |
| 10 | AlCl$_3$ | 10 | 35.5 |
| 11 | Al$_2$(SO$_4$)$_3$ | 100 | 34.8 |
| 12 | Al(O—iPr)$_3$ | 500 | 36.5 |
| 13 | tetraisopropylbis-(dioctylphosphite)titanate | 500 | 12.4 |
| 14 | SnCl$_2$ | 2,000 | 11.8 |
| 15 | VCl$_3$ | 8,000 | 12.7 |
| 16 | MoCl$_2$ | 20,000 | 13.6 |
| 17 | MnCl$_2$ | 1,000 | 15.1 |
| 18 | nickel acetate | 500 | 21.3 |
| 19 | EDTA.Na$_2$Ni | 2,000 | 26.5 |
| 20 | powdered aluminum | 1,000 | 32.4 |
| Comparative Example | | | |
| 1 | none | 0 | 6.6 |

TABLE 1-continued

| | Metallic compound | Metal content (ppm) | Pressure resistance (kg/cm$^2$) sand temp.: 25° C. humidity: 60% RH after 24 hrs. |
|---|---|---|---|
| 2 | none | — | 5.9 |
| 3 | none | — | 7.0 |

TABLE 2

| Example | Metallic compound | Metal content (ppm) | Pressure resistance (kg/cm$^2$) sand temp.: 25° C. humidity: 60% RH after 24 hrs. |
|---|---|---|---|
| 21 | DTA.Na$_2$Cu | 500 | 14.1 |
| 22 | magnesium acetate | 5,000 | 33.2 |
| 23 | Mg(OH) | 100 | 29.2 |
| 24 | CaCl$_2$ | 5,000 | 30.0 |
| 25 | nitrilotris (methylene calcium phosphonate) | 1,500 | 28.5 |
| 26 | Zn(OH)$_2$ | 10,000 | 32.4 |
| 27 | zinc acetate | 100 | 31.5 |
| 28 | (C$_5$H$_5$)$_2$Zn | 50 | 29.8 |
| 29 | aluminum acetate | 250 | 34.3 |
| 30 | aluminum oleate | 100 | 30.7 |
| 31 | DTA.Na$_2$V | 5,000 | 15.3 |
| 32 | DTA.Na$_2$Mn | 500 | 11.9 |
| 33 | NiCl$_2$ | 1,000 | 21.1 |
| 34 | (CH$_5$H$_5$)$_2$Fe | 2,000 | 18.2 |

Examples 35 to 54 and Comparative Examples 4 to 9

These Examples and Comparative Examples are the curing agent compositions listed in Table 3.

Test pieces for pressure testing were prepared by the use of a binder resin composition, the above-described described curing agent compositions, and reclaimed sand obtained by the process for the preparation of reclaimed sand-1, and were examined as to their changes of pressure resistance with time.

Methods for preparing test pieces for pressure test and for the determination of mold strength are described below.

A mixture prepared by mixing 100 parts by weight of reclaimed sand with 0.375 part by weight of each of the curing agent compositions listed in Table 3 and 1.5 parts by weight of a water-soluble phenolic resin composition as a binder resin composition (solid content: 49 wt. %, weight-average molecular weight of the water-soluble phenolic resin: 2300) containing 0.5 wt. % of γ-aminopropyltriethoxysilane was poured into a mold for a test piece having a size of 50 mmφ×50 mmh. From immediately after the mixture was poured into the mold to 24 hours thereafter, the obtained test piece was examined for changes in pressure resistance with time. The sand temperature was 25° C., and the humidity was 60%RH. The pressure resistances determined at 24 hours after each mixture was poured into the mold are given in Table 3.

TABLE 3

| | Curing agent composition | | Metal content* (ppm) | Pressure resistance (kg/cm$^2$) sand temp.: 25° C. humidity: 60% RH after 24 hrs. |
|---|---|---|---|---|
| | organic ether compound | metallic compound | | |
| Example | | | | |
| 35 | ethylene glycol diacetate | CuCl$_2$.2H$_2$O | 5,000 | 12.1 |
| 36 | " | MgCl$_2$ | 4,000 | 30.0 |
| 37 | " | EDTA.Na$_2$Mg | 1,000 | 34.3 |
| 38 | " | C$_2$H$_5$MgBr | 300 | 28.3 |
| 39 | " | Ca-acetate | 5,000 | 30.8 |
| 40 | " | Ca-gluconate | 4,500 | 25.5 |
| 41 | " | BaCl$_2$ | 2,000 | 14.4 |
| 42 | " | ZnCl$_2$ | 200 | 33.2 |
| 43 | " | NTA.NaZn | 800 | 32.0 |
| 44 | " | AlCl$_3$ | 100 | 36.0 |
| 45 | " | Al$_2$(SO$_4$)$_3$ | 200 | 32.1 |
| 46 | " | ferrocene | 1,000 | 18.2 |
| 47 | " | Mg-acetylacetone | 1,500 | 33.8 |
| 48 | " | SnCl$_2$ | 2,000 | 10.5 |
| 49 | γ-butyrolactone | VCl$_3$ | 8,000 | 10.0 |
| 50 | triacetin | MoCl$_2$ | 20,000 | 11.1 |
| 51 | propylene carbonate | MnCl$_2$ | 1,000 | 12.4 |
| 52 | ethylene glycol diacetate | Ni-acetate | 500 | 22.2 |
| 53 | ethylene glycol monoacetate | EDTA.Na$_2$Ni | 2,000 | 26.5 |
| 54 | methyl formate/triacetin (1/4) | powdered aluminum | 5,000 | 25.1 |
| Comparative Example | | | | |
| 4 | γ-butyrolactone | none | 0 | 5.2 |

TABLE 3-continued

| | Curing agent composition | | Metal content* | Pressure resistance (kg/cm$^2$) sand temp.: 25° C. humidity: 60% RH |
|---|---|---|---|---|
| | organic ether compound | metallic compound | (ppm) | after 24 hrs. |
| 5 | triacetin | " | 0 | 7.5 |
| 6 | propylene carbonate | " | 0 | 6.5 |
| 7 | ethylene glycol diacetate | " | 0 | 7.1 |
| 8 | ethylene glycol monoacetate | " | 0 | 8.5 |
| 9 | methyl formate/triacetin (1/4) | " | 0 | 6.7 |

*Metal content, that is, the content of the metallic compound in terms of the metallic element, in the above-described curing agent compositions were determined in a similar manner to the determination of the content of the metallic compound in the binder resin composition, except that the curing agent composition was employed instead of the binder resin composition.

The method for determination of the content of the metallic compound in terms of metallic element in sand is described below.

Sand is ground into 150-mesh or smaller particles and 0.2 to 0.3 g of the resulting sand is weighed onto a 100-ml platinum dish. 5 ml of concentrated hydrochloric acid, 3 ml of concentrated hydrofluoric acid and 10 ml of concentrated perchloric acid are added to the sand to evaporate off silicon. 10 ml of HCl (1+1) and 10 ml of H$_2$O are added to the remaining mixture and the obtained mixture is heated to dissolve the residual salts. The obtained mixture is filtered through a filter paper No. 5C. The filter cake is washed with diluted hydrochloric acid aqueous solution and hot water. The residue is ashed at 900° to 1000° C. in a 30-ml platinum crucible and cooled by allowing to stand. 2 g of potassium pyrosulfate is added to the ash to conduct acid melting at 800° C. To the obtained melt, 15 ml of water was added and the resultant mixture was heated to solution. Then, the obtained solution was combined with the filtrate recovered above, followed by the adjustment of the total volume to 100 ml with water with a measuring flask. The amount of the metal in the obtained solution was determined by the ICP (inductively coupled plasma emission spectrochemical analysis) method.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claimed is:

1. A binder resin composition comprising a water-soluble phenolic resin curable with an organic ester compound and a compound containing a metallic element in an amount of from 0.0005 to 5% by weight, in terms of the metallic element, and based on the weight of the water-soluble phenolic resin, wherein said metallic element is selected from the group consisting of Sc, Y, Al, Ga, In, Tl, Ti, Zr, Hf, Sn, Pb, Bi, Cr, Mo, W, Po, Mn, Tc, Re, Fe, Co, and Ni.

2. The binder resin composition as set forth in claim 1, wherein said composition contains said compound containing said metallic element in an amount of from 0.001 to 3% by weight in terms of the metallic element based on the weight of the water-soluble phenolic resin.

3. The binder resin composition as set forth in claim 1, wherein said metallic element is selected from the group consisting Al and Zr.

4. The binder resin composition as set forth in claim 1, wherein the form of said compound containing said metallic element is selected from the group consisting of powdered metals, metal oxides, metal hydroxides, metal salts of inorganic acids, metal salts of organic acids and metal complexes.

5. The binder resin composition as set forth in claim 1, wherein said binder resin composition further comprises a silane coupling agent.

6. The binder resin composition as set forth in claim 5, wherein said silane coupling agent is selected from the group consisting of γ-aminopropyltriethoxysilane, γ-(2-aminoethyl)aminopropyltrimethoxysilane and γ-glycidoxypropyltrimethoxysilane.

7. A process for preparing the binder resin composition as set forth in claim 1, comprising adding said compound containing said metallic element to a raw material composition which is used for synthesizing the water-soluble phenolic resin.

8. A curing agent composition comprising an organic ester compound and a compound containing a metallic element in an amount of from 5 to 200,000 ppm in terms of the metallic element, based on the weight of the organic ester compound, wherein the metallic element is selected from the group consisting of Sc, Y, Al, Ga, In, Tl, Ti, Zr, Hf, Sn, Pb, Bi, Cr, Mo, W, Po, Mn, Tc, Re, Fe, Co, and Ni.

9. The curing agent composition as set forth in claim 8, wherein said composition contains said compound containing said metallic element in an amount of from 20 to 100,000 ppm in terms of the metallic element based on the weight of the organic ester compound.

10. The curing agent composition as set forth in claim 8, wherein said metallic element is selected from the group consisting of Al and Zr.

11. The curing agent composition as set forth in claim 8, wherein the form of said compound containing said metallic element is selected from the group consisting of powdered metals, metal oxides, metal hydroxides, metal salts of inorganic acids, metal salts of organic acids and metal complexes.

12. The curing agent composition as set forth in claim 8, wherein said organic ester compound is a lactone.

13. The curing agent composition as set forth in claim 8, wherein said organic ester compound has an alcohol moiety of a mono- or polyhydric alcohol having 1 to 10 carbon atoms and an acid moiety of an organic carboxylic acid having 1 to 10 carbon atoms.

14. The curing agent composition as set forth in claim 8, wherein said organic ester compound is selected from the group consisting of ethylene glycol monoacetate, ethylene glycol diacetate, triacetin, propylene carbonate, methyl formate, ethyl formate, propiolactone, γ-butyrolactone and ε-caprolactone.

15. A caking additive composition comprising a water-soluble phenolic resin, an organic ester compound, and a compound containing a metallic element, wherein the metallic element is selected from the group consisting of Sc, Y, Al, Ga, In, Tl, Ti, Zr, Hf, Sn, Pb, Bi, Cr, Mo, W, Po, Mn, Tc, Re, Fe, Co, and Ni.

16. The caking additive composition as set forth in claim 15, wherein said composition contains said compound containing said metallic element in an amount of from 0.0005 to 5% by weight in terms of the metallic element based on the weight of the water-soluble phenolic resin.

17. The caking additive composition as set forth in claim 15, wherein said composition contains said compound containing said metallic element in an amount of from 5 to 200,000 ppm in terms of the metallic element based on the weight of the organic ester compound.

18. The caking additive composition as set forth in claim 15, wherein said metallic element is selected from the group consisting of Al and Zr.

19. The caking additive composition as set forth in claim 15, wherein the form of said compound containing said metallic element is selected from the group consisting of powdered metals, metal oxides, metal hydroxides, metal salts of inorganic acids, metal salts of organic acids and metal complexes.

20. The caking additive composition as set forth in claim 15, wherein said caking additive composition further comprises a silane coupling agent.

21. The caking additive composition as set forth in claim 20, wherein said silane coupling agent is selected from the group consisting of γ-aminopropyltriethoxysilane, γ-(2-aminoethyl)aminopropyltrimethoxysilane and γ-glycidoxypropyltrimethoxysilane.

22. A kit comprising the caking additive composition as set forth in claim 15, wherein said kit comprises a package (A), comprising said water-soluble phenolic resin, and a package (B), comprising said organic ester compound, and wherein said compound containing said metallic element is present in said package (A), or said package (B), or both.

23. A kit comprising the caking additive composition as set forth in claim 15, wherein said kit comprises a package (C), comprising said water-soluble phenolic resin, a package (D) comprising said organic ester compound, and a package (E), comprising said compound containing said metallic element.

24. A casting mold composition comprising said caking additive composition as set forth in claim 15 and a refractory granular material.

25. The casting mold composition as set forth in claim 24, wherein said refractory granular material comprises recovered or reclaimed sand for reuse.

26. The casting mold composition as set forth in claim 24, wherein said casting mold composition comprises from 0.2 to 7.5 parts by weight, based on 100 parts by weight of the refractory granular material, of said water-soluble phenolic resin, from 0.05 to 9 parts by weight, based on 100 parts by weight of the refractory granular material, of said organic ester compound, from 0.0001 to 10 parts by weight (in terms of the metallic element), based on 100 parts by weight of the refractory granular material, of said compound containing said metallic element, and water.

27. A casting mold comprising a cured resin which is obtained by curing a water-soluble phenolic resin with an organic ester compound in the presence of a compound containing a metallic element and a refractory granular material, wherein the metallic element is selected from the group consisting of Sc, Y, Al, Ga, In, Tl, Ti, Zr, Hf, Sn, Pb, Bi, Cr, Mo, W, Po, Mn, Tc, Re, Fe, Co, and Ni.

28. The casting mold as set forth in claim 27, wherein said refractory granular material recovered or reclaimed sand for reuse.

29. A process for manufacturing a casting mold comprising curing a water-soluble phenolic resin with an organic ester compound in the presence of a compound containing a metallic element and a refractory granular material, wherein the metallic element is selected from the group consisting of Sc, Y, Al, Ga, In, Tl, Ti, Zr, Hf, Sn, Pb, Bi, Cr, Mo, W, Po, Mn, Tc, Re, Fe, Co, and Ni.

30. The process as set forth in claim 29, wherein said water-soluble phenolic resin and said compound containing said metallic element are supplied together in a binder resin composition.

31. The process as set forth in claim 29, wherein said organic ester compound and said compound containing said metallic element are supplied together in a curing agent composition.

32. The process as set forth in claim 29, wherein said water-soluble phenolic resin, said organic ester compound, and said compound containing said metallic element are supplied together in a caking additive composition.

33. The process as set forth in claim 29, wherein said refractory granular material comprises recovered or reclaimed sand for reuse.

34. A kit comprising the caking additive composition as set forth in claim 23, wherein said kit comprises a package (C), comprising said water-soluble phenolic resin, a package (D) comprising said organic ester compound, and a package (E), comprising said compound containing said metallic element.

35. A casting mold composition comprising said caking additive composition as set forth in claim 23 and a refractory granular material.

36. The casting mold composition as set forth in claim 35, wherein said refractory granular material comprises recovered or reclaimed sand for reuse.

* * * * *